(12) United States Patent
Camborde

(10) Patent No.: US 8,667,240 B2
(45) Date of Patent: *Mar. 4, 2014

(54) METHOD FOR AUTOMATICALLY BACKING UP DIGITAL DATA PRESERVED IN MEMORY IN A COMPUTER INSTALLATION AND DATA MEDIUM READABLE BY A COMPUTER HAVING THE ASSOCIATED INSTRUCTIONS STORED IN THE MEMORY THEREOF

(71) Applicant: F-Secure Corporation, Helsinki (FI)

(72) Inventor: Christophe Camborde, Paris (FR)

(73) Assignee: F-Secure Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,274

(22) Filed: Feb. 22, 2013

(65) Prior Publication Data

US 2013/0179654 A1    Jul. 11, 2013

Related U.S. Application Data

(63) Continuation of application No. 12/746,299, filed as application No. PCT/FR2008/052210 on Dec. 4, 2008, now Pat. No. 8,412,898.

(30) Foreign Application Priority Data

Dec. 6, 2007 (FR) ...................................... 07 08519

(51) Int. Cl.
*G06F 12/00* (2006.01)
(52) U.S. Cl.
USPC .......................................... 711/162; 711/161
(58) Field of Classification Search
USPC .................................. 711/162, 161
See application file for complete search history.

(56) References Cited

U.S. PATENT DOCUMENTS

| 2002/0087588 | A1  | 7/2002  | McBride et al. | |
|---|---|---|---|---|
| 2003/0177324 | A1* | 9/2003  | Timpanaro-Perrotta | 711/162 |
| 2005/0050117 | A1  | 3/2005  | Seo et al. | |
| 2005/0060356 | A1  | 3/2005  | Saika | |
| 2005/0240732 | A1  | 10/2005 | Crick et al. | |
| 2005/0257085 | A1  | 11/2005 | Haustein et al. | |
| 2005/0289197 | A1* | 12/2005 | Kan et al. | 707/204 |
| 2006/0015698 | A1* | 1/2006  | Kim et al. | 711/162 |
| 2006/0259724 | A1* | 11/2006 | Saika | 711/162 |
| 2007/0174567 | A1* | 7/2007  | Deguchi et al. | 711/162 |
| 2008/0147981 | A1  | 6/2008  | Crick et al. | |
| 2009/0031098 | A1* | 1/2009  | Sartore | 711/162 |

FOREIGN PATENT DOCUMENTS

EP              1 511 269           3/2005

* cited by examiner

*Primary Examiner* — Hashem Farrokh
(74) *Attorney, Agent, or Firm* — Oblon, Spivak, McClelland, Maier & Neustadt, L.L.P.

(57) ABSTRACT

The invention relates to a method for automatically backing up digital data preserved in memory in a computer installation to a remote backup system accessible through the computer installation via a data transmission network. This method comprises extracting and analyzing information regarding the operation of the computer installation and determining parameters of a data backup application for saving data to the backup system. Based on the result of this analysis, the digital data preserved in memory is analyzed and the digital data analyzed is classified into a plurality of classes of different priorities. The backup application is also executed on at least part of the digital data based on the parameters and classes of priorities determined.

9 Claims, 3 Drawing Sheets

Figure 1:
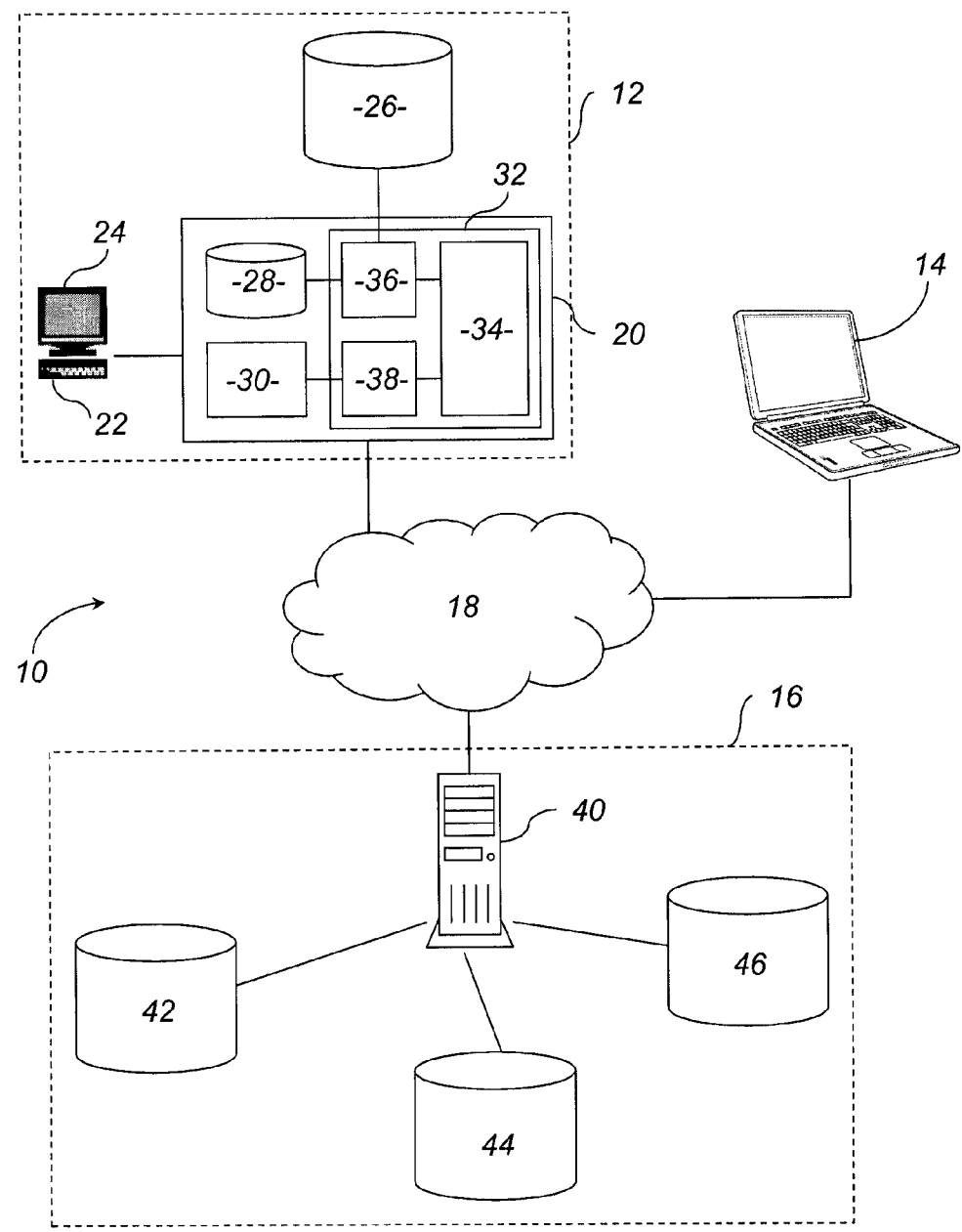

METHOD FOR AUTOMATICALLY BACKING UP DIGITAL DATA PRESERVED IN MEMORY IN A COMPUTER INSTALLATION AND DATA MEDIUM READABLE BY A COMPUTER HAVING THE ASSOCIATED INSTRUCTIONS STORED IN THE MEMORY THEREOF

CROSS REFERENCE TO RELATED APPLICATIONS

This application is a continuation of U.S. application Ser. No. 12/746,299 filed Jun. 4, 2010, the entire content of which is incorporated herein by reference. U.S. application Ser. No. 12/746,299 is a National Stage of PCT/FR08/52210 filed Dec. 4, 2008 and claims priority to French Application No. 07 08519 filed Dec. 6, 2007.

The present invention concerns a method for automatic backup of digital data, kept in memory in a computer installation, to a remote backup system accessible by the computer installation via a data transmission network. It also concerns a computer-readable data medium, a computer installation and a system for implementation of this method.

Such backup methods are known and enable access to digital data kept in memory in a computer installation to be protected. Indeed, this access may be hindered through:
  simple loss of the digital data of the computer installation following catastrophes such as flood, fire, or more simply accidents such as unexpected damage to a hard disk or, even more commonly, following poor operation caused by a user, or
  partial or general malfunction, even temporary, of the computer installation preventing further access to the data which its stores.

Since increasing volumes of important or even vital data are stored in electronic form, it is essential to design backup methods providing a high guarantee of recovering this data in the most recent version possible in the event of a problem with the computer installation. It is also important that these methods should be automatic in order that users need not be concerned with them in their day-to-day use of the computer installation. These methods are therefore generally implemented in the form of previously configured backup applications, executed in the computer installation.

The American patent published as number U.S. Pat. No. 6,757,698 thus proposes a method implemented through a backup application which is configurable by a user. The user determines themselves which digital data they wish to back up regularly, and defines the frequency of the backups. To guarantee the security of the backed-up data, several backup destinations should be defined, one of which being a remote storage system, accessible by the host computer installation via the Internet. With each programmed backup, the application determines which data has been modified since the previous backup, and selects only the data which has been modified or added for the new backup.

However, although it is automatic this method requires a certain expertise on the part of the user to define all the backup application execution settings. For optimum operation of the backups, the latter can, indeed, vary from one computer installation to another. In addition, this presupposes that the user knows how to determine all the important data which deserves to be backed up. Although this is indeed realistic when the user is a professional acting within a company's IT support department, the same cannot generally be said when the user is an individual, or even a manager of a small professional entity without the resources to have an IT support department.

It may therefore be desirable to design an automatic backup method which is simple to use and requires no special knowledge on the part of the user, in respect of backups, or more generally IT systems.

A subject of the invention is therefore a method for automatic backup of digital data, kept in memory in a computer installation, to a remote backup system accessible by the computer installation via a data transmission network, characterised in that it comprises the steps consisting in:
  extracting and analysing operating information of the computer installation and determining the settings of an application for backing up data to the backup system, depending on the result of this analysis,
  analysing the digital data kept in memory and classifying the analysed digital data into a plurality of classes of differing priorities,
  executing the backup application on at least a part of the digital data, according to the determined settings and classes of priorities.

By using prior steps of combined analyses of the digital data and of the general operation of the computer installation which hosts them, expertise of the end user is able to be obviated in configuring the backup application and selecting the data to be backed up.

As an option, the settings of the backup application comprise at least one of the elements of the set consisting of a consumed power limit authorised for the backup application, an option to execute the backup application in degraded mode, and criteria for selecting the digital data to be backed up.

As an option, the criteria for selection and/or the classification of the digital data into classes of differing priorities relate at least to the nature of the digital data.

As an option, the criteria for selection and/or the classification of the digital data into classes of differing priorities also relate to at least one of the elements of the set consisting of its size, of its dates of creation, latest modification and/or latest access, of additional data associated with it, of a directory in which it is located, of a relationship between this data and a registry database of the operating system of the computer installation and of whether or not the data is included in a list of data which is a priori excluded, or a priori included.

As an option, the operating information of the computer installation includes at least one of the elements of the set consisting of available power and memory, of the nature and of the version of the operating system of the computer installation, of the nature of the applications installed and able to be executed by the computer installation, of the nature and capacity of a connection of the computer installation to the transmission network, and of a date of manufacture or of commissioning of the computer installation.

As an option, the automatic backup method includes a step consisting in defining at least a part of the settings of the backup application from an administration server connected to the data transmission network, and in transmitting said part of the settings to the computer installation for execution of the backup application on the basis of at least said part of the settings.

As an option, the automatic backup method further includes a step consisting in detecting the creation in memory or the modification of a digital element and, in response to this detection, in analysing this digital element in order to assign a priority coefficient to it, and in executing the backup application on this digital element, according to the settings and the priority coefficient which is assigned to it.

A subject of the invention is also a computer-readable data medium comprising instructions for the implementation of a method according to the invention.

A subject of the invention is also a computer installation for the automatic backup of digital data to a remote backup system accessible by the computer installation via a data transmission network, comprising means for storage of digital data and an application for backing up at least part of the digital data to the remote backup system, characterised in that it also includes:

- means for extracting operating information of the computer installation, means for analysing this information and means for determining settings of the backup application according to the result of this analysis,
- means for analysing the digital data stored by the computer installation and means for classifying the analysed digital data into a plurality of classes of differing priorities, and in that the backup application is configured in order to be executed on at least a part of the digital data, according to the determined settings and classes of priorities.

Finally, a subject of the invention is also a computer system for the automatic backup of digital data kept in memory in a computer installation, comprising a computer installation according to the invention and a remote backup system accessible by the computer installation via a data transmission network.

Figure 2:
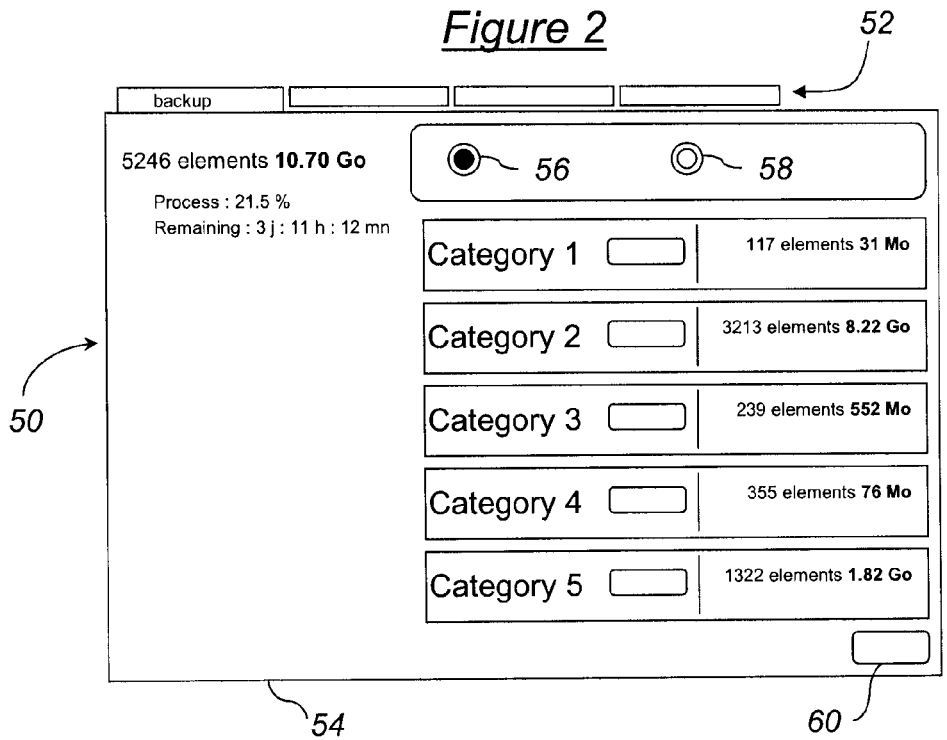
Figure 3:
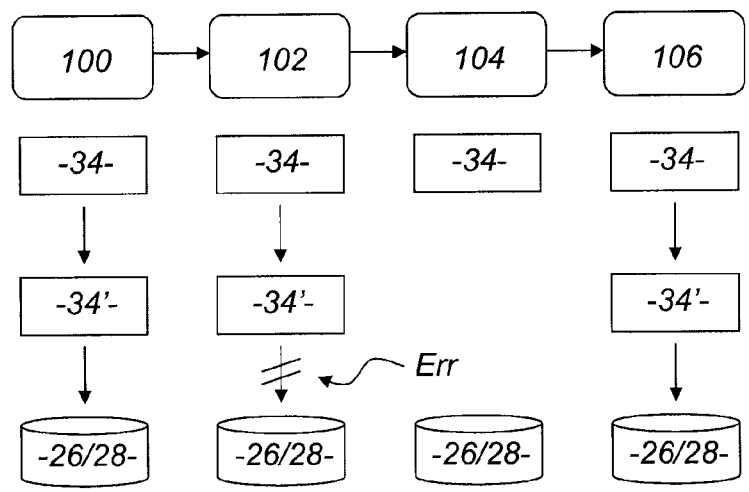
Figure 4:
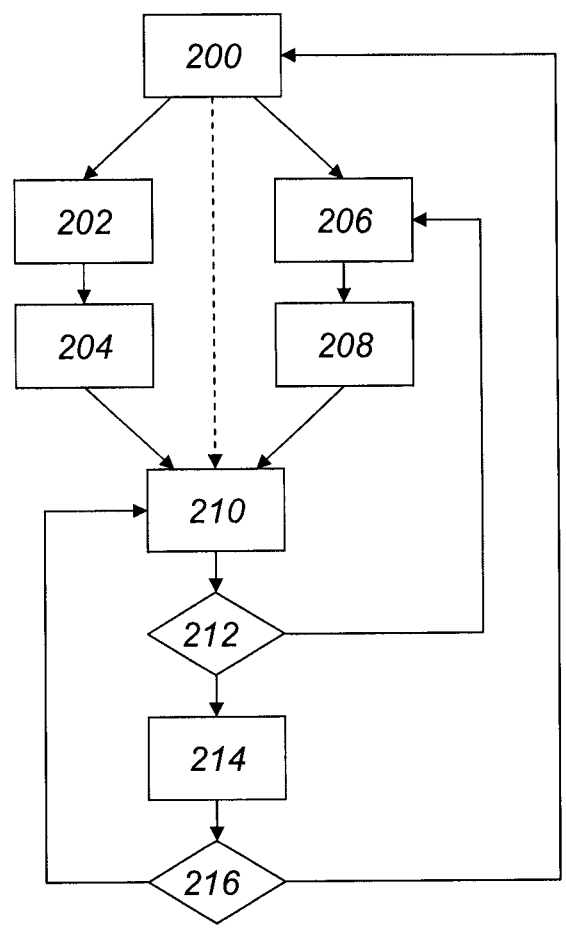

The invention will be better understood by means of the following description, given solely as an example, and made in reference to the appended drawings, in which:

FIG. 1 represents the general structure of computer system for the automatic backup of digital data, complying with an embodiment of the invention, FIG. 2 represents diagrammatically an interface of a backup application implemented in the system of FIG. 1, FIG. 3 partially illustrates the operation of the backup application of FIG. 2, for access to the digital data, and FIG. 4 illustrates the successive steps of a method for automatic backup of digital data, according to an embodiment of the invention.

Computer system 10 represented in FIG. 1 is configured for the automatic backup of digital data kept in memory in a computer installation 12 or 14, to a remote backup system 16.

This remote backup system 16 is accessible by the computer installation 12 or 14 via a data transmission network 18 such as the Internet network.

Computer installation 12 or 14 may be of any type, from a simple laptop 14 to a more complex installation such as installation 12. Installation 12, which is presented more specifically as an example, comprises a microcomputer consisting of a central unit 20 connected to several peripherals, including a keyboard 22, a screen 24 and an external hard disk 26.

Central unit 20 of computer installation 12 comprises, in a traditional configuration (not represented), a microprocessor and storage spaces of the internal hard drive, RAM, ROM and/or EEPROM memory type, interconnected by means of a communication bus. These elements enable internal digital data storage means 28, a programmed module 30 for extraction of operating information of the computer installation 12, and an analysis and backup software application 32, to be constituted.

Software application 32 contains an application 34 for backup, to backup system 16, of at least part of the digital data stored in the internal storage means 28, and in the external hard disk 26. It also contains a programmed module 36 for analysis of this digital data and for classification of the analysed digital data into a plurality of classes of differing priorities. Finally, it comprises a programmed module 38 for analysis of the operating information of computer installation 12 extracted by module 30, and means for determining settings of the backup application 34 depending on the result of this analysis.

Remote backup system 16 comprises at least one access server 40 connected to the network 18. A single access server 40 is represented in FIG. 1 for the sake of simplicity, but in reality multiple servers are required. This access server 40 is, in addition, connected locally to multiple secure storage spaces 42, 44, 46, intended to receive the data backed up from several installations connected to the network 18, such as computer installation 12 or 14.

The operation of the backup application 34 will now be described in detail, with reference to FIGS. 2 and 3.

As is represented in FIG. 2, execution of the backup application 34 may be monitored, or indeed managed, by a user using an interactive interface 50, visible on screen 24. This interface 50 comprises several windows showing information, which can be displayed selectively through clicking tabs 52. In the example of FIG. 2, which is purely illustrative, it has four such windows, which can be displayed using tabs, such as a data backup tab, a data restoration tab, a tab for configuring the application and a help tab. In the example of FIG. 2, the data backup tab is pressed, and a window 54 displaying the backup of the data is displayed on screen 24.

Window 54 gives, for example, at the top left, information allowing the pending backup to be monitored: the number (for example 5246) of elements selected by the backup application 34 and the total corresponding size of the digital data to be backed up (10.70 Gigabytes), the progress of the backup ("Process: 21.5%") and an estimation of the remaining time required ("Remaining: 3 d: 11 h: 12 min."). As a variant, in an embodiment which is simpler to implement, only an indication in real time of the number and size of the documents backed up by the backup system 16 is displayed.

As an option, in an area represented here at the top right of window 54, two active buttons 56 and 58 enable selection, either of a default operating mode of the backup application, in which the selection of the digital data for the backup is made automatically according to the settings and classes of priorities determined by the programmed modules 36 and 38 (active button 56 selected), or of an advanced operating mode of the backup application in which the selection can be modified or even completely redefined, manually, by the user (active button 58 selected).

As an option, in an area represented here in the right-hand part of window 54, the selected elements are represented by categories and the information allowing monitoring of the backup is at least partially listed in each category. Whether an element, i.e. of a digital element identified by a file, belongs to a given category is, for example, determined automatically by the programmed analysis module 36 using the type of the digital element identified by the corresponding file extension. It can also be determined automatically using additional data associated with the corresponding file, commonly called metadata, or using the location of the file in a tree structure of directories of the computer installation 12. Thus, the first category, called "category 1", concerns the office suite documents produced by word processors, spreadsheets or other applications, recognisable by extensions such as *.doc, *.xls, *.ppt, etc. A second category, called "category 2", concerns documents of the photograph or video type, recognisable by extensions such as *.jpg, *.tiff, *.bmp, *.mpg, *.avi, etc. A third category, called "category 3", concerns documents of the audio type, recognisable by extensions such as *.wav, *.au, etc. A fourth category, called "category 4", concerns email, contacts and favourites documents, such as the content of email input/output letterboxes. Finally, a fifth category, called "category 5", concerns the other documents, those which do not correspond to any of the previous four categories.

These five categories, category 1 to category 5, are for example ordered from the most important to the least important, and this property must be taken into account by the backup application 34 when it is executed. In addition, the digital data within a given category can be ordered hierarchically by order of importance into several classes of differing priorities, according to their type, or other criteria, so as to refine the classification of the data and consequently the backup strategy.

Finally, as an option, an active button 60 located, in the example of FIG. 2, at the bottom right of window 54, allows the user to temporarily suspend execution of the backup application 34.

FIG. 3 illustrates an embodiment in which operation of the backup application 34 is designed to protect itself against "fatal" errors. A fatal error may occur, for example, when access to an element by an application conflicts with the action of another application in relation to this element, or is disturbed by a malfunction of the computer installation. In this case, the application which attempts to access the element is suddenly interrupted. To prevent the backup application 34 being subjected to this type of risk in this embodiment, the latter does not directly access the data to be backed up. It executes another application 34', called the "read" application, which accesses the data instead of it, and transmits it to it.

Thus, in a first step 100, the backup application 34, which is executed in computer installation 12, starts read application 34' to access digital data to be backed up, which may be stored either on the external hard disk 26, or in the internal storage means 28.

In a following step 102, a fatal error Err occurs during access to a digital element by read application 34'. Execution of read application 34' is then suddenly interrupted in a step 104.

This interruption of execution is detected by backup application 34 which, in a step 106, restarts read application 34' to access digital data to be backed up, as in step 100. Consequently, the fatal error Err has not disturbed the execution of backup application 34, which is protected as a result.

Moreover, when backup application 34 detects the interruption of execution due to the fatal error Err, it can temporarily exclude the element or area of data which has caused this interruption, and then resume the backup in step 106 with other data requiring to be backed up. When execution completes, when it has backed up all the other data, backup application 34 can then return to the data having caused the fatal error.

As an option, during its execution backup application 34 generates a backup operations log file which is stored, for example, on the internal hard disk of computer installation 12. Thus, in the event of an unexpected interruption of the application due to any problem whatever, the application can resume at the location where it was interrupted using this log file.

Also as an option, execution of the analysis and backup application 32, which may consume a substantial proportion of the computation time of computer installation 12, is subjected to a consumed computation time regulator comprising the following two functions:

a function for observing the computation power consumed at every moment by application 32, and a function for regulating the quantity of operations performed by application 32.

The operation of programmed modules 30, 36 and 38 will now be described in detail.

Bearing in mind that the digital data of the computer installation is stored in the form of files, the role of module 36, for analysis and classification of the digital data likely to be backed up, is broken down as follows:

it must firstly determine a set of files of the computer installation which are likely to be backed up, and automatically extract information concerning these files, it must then analyse this extracted information in order to associate each file with a given class of priority in order, if applicable, to a priori exclude certain files from the backup, or on the contrary to consider certain of them as vital.

The relevant information concerning a digital data file extracted by programmed module 36 comprises at least one of the elements in the following list:

information concerning the nature of the file, which is given by the file extension and/or by its attributes (a file attribute is taken to mean whether a file is or is not read-only, whether a file is or is not hidden, and whether a file is or is not ready to be archived), the size of the file, the dates of creation, latest modification and/or latest access to the file, characterising use of the file and therefore its importance, the metadata associated with the file, which may have been entered manually by the user, or automatically by the application having generated this file (for example, data concerning digital management of the rights associated with the file), the nature of the directory in which the file is located, a predetermined list of directories which may have been defined to identify the specific importance of certain directories, the relationship between the file in question and the other files in the directory in which it is located, which enables a decision to be made as to whether a file which otherwise is unimportant, but which is stored in the same directory as important files, then becomes an important file, the relationship between the file and the registry database of the operating system of computer installation 12, in other words the existence of an association between the file and a software application of the installation to read it and/or execute it, the question of whether the file belongs to a list of files which are a priori excluded, such as temporary files or system files.

The analysis of the information extracted to associate each file with a given class of priority may be made using a set of predetermined rules enabling a coefficient to be estimated for each file, which will determine whether or not it belongs to a class, or will determine that it be a priori excluded. This set comprises, for example, at least one, or a combination of the following rules:

the file extensions are a priori classified according to an order of priority; for example, as was seen above, extensions of the office suite type (*.doc, *.xls, *.ppt, etc.) are high-priority files and are given a high priority coefficient; after this come extensions of the photograph or video type (*.jpg, *.tiff, *.bmp, *.mpg, *.avi, etc.), and then extensions of the audio type (*.wav, *.au), etc., regarding the attributes, hidden files, archived files or read-only files are a priori excluded from the backup, or at least their priority coefficient is very low, if the size of the file is not between a predetermined minimum and maximum, the file is automatically excluded from the backup, or at least its priority coefficient is very low, if the file has been created or modified recently, or is read often, its priority coefficient is made higher, a predetermined list of directories is a priori defined as important and/or certain directories are associated with predetermined priority coefficients, if the file is not considered in itself as important during a first analysis, but is located in a directory in which important files are located, its priority coefficient is made higher, if the file is not associated with any application, according to the registry database of the operating system of computer installation 12, its priority coefficient is made lower, files such as temporary files of Internet browsers or operating system files are excluded.

Extraction of information concerning files likely to be backed up, and analysis of it allow the files to be classified into several classes of differing priorities. This hierarchy of classes, which may be combined if applicable with the hierarchy of the abovementioned categories 1 to 5, is then used by backup application 34 to define its backup priorities, or even to make a selection, depending on the circumstances.

The circumstances in which the backup application is executed and, consequently, the choice of a backup strategy and therefore a strategy for configuration of backup application 34, are determined by the programmed modules 30 and 38.

Module 30 for extraction of operating information of computer installation 12, for example, extracts at least one of the following items of information:

the age of the computer installation 12 (date of manufacture or of commissioning), the nature and version of the operating system, the nature of the applications used by the computer installation and their versions (email applications, antivirus and firewall applications, etc.), the available power and memory, the nature and capacity of the computer installation's connection to the network 18, the frequency with which computer installation 12 is started up, put on standby or shut down, general organisation of the directories and classification of the files in these directories.

On the basis of the information extracted by programmed module 30, analysis module 38 undertakes an analysis, for example according to predefined rules, such as:

if computer installation 12 is obsolete and its capacities limited, or if there is a low power and memory, or if the bandwidth of the connection to network 18 is low, choose a degraded backup strategy, in which only the most important classes are selected according to a threshold to be determined and, if applicable, notify the user of the computer installation 12 by email, if this is a first backup of the digital data of computer installation 12, also choose the degraded backup strategy, if applicable compressing part of the backed-up data, then restart backup application 34 once again, replacing the data which has been backed up in compressed form with this same data in its original format and size, match the execution of application 34 to the frequency with which computer installation 12 is started up, put on standby or shut down, execute backup application 34 as a background task without disturbing operation of the computer installation, and regularly detect, possibly in real time, file modifications or creations in order to back them up as a priority.

On the basis of this analysis, backup application 34 is automatically configured by module 38 so as to define a backup strategy.

A matrix of detectable potential problems and of predefined configuration solutions can also be planned to complete the analysis and refine the backup strategy.

As an example, the following characteristic situations can thus be defined:

1—nominal usage case: computer installation 12 operating three hours per day;

2—special usage case: computer installation 12 operating continuously, i.e. never shut down when used in standard fashion;

3—critical usage case: backup application 34 executed manually and rarely, or computer installation 12 operating 2 hours per month, or backup account associated with installation 12 in the backup system 16 has been empty for too long a period;

4—blockage or sudden shutdown of analysis and backup application 32 during the phase of analysis of the files likely to be backed up, or of transfer of the files to be downloaded;

5—the phase for analysis of the files likely to be backed up is excessively long;

6—backup hindered by other applications (antivirus application excessively constrictive, insufficient rights);

7—poor quality connection to network 18;

8—backup account associated with installation 12 in backup system 16 has been empty for too long a period;

9—transfer time of files to be backed up excessively long;

10—unknown problem;

11—emergency plan: no file transferred to the backup account associated with installation 12 one week after activation of backup application 34.

When faced with these characteristic situations it is possible, for example, to have the following configuration rules:

A—if a problem is detected during the phase of analysis of the files likely to be backed up, or of transfer of the files to be downloaded (excessively long, blockage or sudden shutdown), the data source in question is temporarily excluded to allow the backup of the other data to continue;

B—backup application 34 is configured so as to operate in accordance with the embodiment illustrated by FIG. 3;

C—the result of the previous action is kept in a backup log file in order that it can be resumed following a possible sudden shutdown;

D—backup application 34 is configured to operate in a very degraded mode in which no analysis of the files likely to be backed up is made, but in which only certain directories a priori judged to be critical are backed up;

E—a connectivity management system is installed intended to notify backup application 34 optimally of any network problems;

F—the speed of the analysis phase is optimised;

G—small files to be backed up are grouped into batches;

H—certain types of files, for example images, are compressed;

I—files are classified by order of importance;

J—there is clear and summarised activity logging, full logging and logging of the environment during execution of backup application 34;

K—resumption of the phase of analysis of the files likely to be backed up, or of transfer of the files to be downloaded from the last position;

L—define preselection and/or exclusion of certain elements for the first backup;

M—temporarily back up reduced images;

N—configure backup application 34 such that it operates in a mode in which the duration of the phase for analysis of the files likely to be backed up is limited, so as rapidly to begin a backup, and where the analysis can then be resumed at a later stage in order to undertake a more complete backup.

The matrix can then have the following form:

|    | A | B | C | D | E | F | G | H | I | J | K | L | M | N |
|----|---|---|---|---|---|---|---|---|---|---|---|---|---|---|
| 1  | X |   | X |   |   | X | X | X | X |   | X |   |   | X |
| 2  |   | X |   |   |   |   |   |   |   |   |   |   |   |   |
| 3  |   |   |   | X |   |   | X | X | X |   |   | X | X | X |
| 4  | X | X | X |   |   |   |   |   |   |   | X |   |   |   |
| 5  | X |   | X |   | X |   |   |   |   |   | X |   |   | X |
| 6  |   |   |   |   |   |   |   |   |   | X |   |   |   |   |
| 7  |   |   |   |   | X |   |   |   |   |   | X |   |   |   |
| 8  |   | X |   |   |   |   | X | X | X |   | X |   |   | X |
| 9  |   |   |   |   |   |   | X | X |   |   |   |   | X |   |
| 10 |   |   |   |   |   |   |   |   |   | X |   |   |   |   |
| 11 |   |   |   |   |   |   |   |   |   |   | X | X |   |   |

The operation of analysis module 38 is presented above as based on a set of rules and can thus be implemented in the form of an expert system. But as a variant it is also possible to envisage an implementation in the form of a neural network, of the multi-layer perceptron type, in which the input data is the data extracted by programmed module 30, and the output data is the settings of backup application 34. A set of rules is, in the latter case, not necessarily predefined, but is constructed by automatic configuration of the neural network during learning phases.

As an addition to the configuration accomplished by analysis module 38, access to the settings of backup application 34, and more generally to those of analysis and backup application 32, may be authorised remotely, from backup server 40, or from any other administration server. Specific access authorisations are then given, to enable an administrator of backup system 16 to access the settings of several analysis and backup applications implemented in several computer installations, such as installations 12 and 14.

Using these specific authorisations, the administrator is able to regulate the incoming digital data traffic to be backed up to the multiple secure storage spaces 42, 44 and 46. They can therefore, in order to prevent any overload of backup system 16, notably in the case of an excess number of simultaneous connections, remotely control the backup strategy of application 32 of computer installation 12 and of the other installations. In other words, they can impose a management of priorities allowing the most important files in the most important installations to be backed up as a high priority. This authorised intervention of the administrator is, naturally, transparent for the user of computer installation 12. The intervention of the administrator in the remote configuration can be accomplished for all the installations managed by the backup system, for part of them only, or for a single computer installation.

The successive steps of a backup method, implemented by system 10 illustrated in FIG. 1 according to an embodiment of the invention, will now be described in reference to FIG. 4.

During a first initialisation step 200, analysis and backup application 32 starts the execution of programmed modules 30, 36 and 38.

This first step is therefore followed firstly by two steps 202 and 204 for extraction and analysis of operating information of computer installation 12 to determine the settings of backup application 34 depending on the result of this analysis (the function of modules 30 and 38), and secondly by two steps 206 and 208 for analysis of the digital data kept in memory, and for classification of the analysed digital data into a variety of classes of differing priority (the function of module 36).

During extraction step 202, programmed module 30 is executed in accordance with what is described above, and provides the extracted data to programmed module 38.

In analysis and configuration step 204, programmed module 38 is executed in accordance with what is described above, and determines the operating settings of backup application 34. During this step, but also throughout the implementation of the backup method, as has also been mentioned, the administrator of backup system 16 can intervene in defining the settings, so as to refine the backup strategy, notably according to constraints external to computer installation 12. It is also during this step that analysis module 38 can decide to impose a backup in degraded mode. Finally, during step 204, a file, called a cache file, reproducing a tree structure of the data of installation 12 previously backed up in backup system 16, also having, if applicable, the attributes of the corresponding files, can be downloaded from backup server 40, notably if data has been modified in backup system 16 without the intervention of analysis and backup application 32. This cache file enables use of the bandwidth of computer installation 12 to be limited with regard to network 18, and thus enables the backup method to be accelerated.

During analysis step 206, module 36 for data analysis and classification lists all the files of computer installation 12 likely to be backed up, and automatically extracts data concerning these files, in accordance with what has been described above.

In the next classification step 208, it analyses this extracted data in order to associate each file with a given class of priority, in order, if applicable, to a priori exclude certain files from the backup, or on the contrary to consider certain of them to be vital, in accordance with what has been described above.

Steps 206 and 208 can be very lengthy. Thus, according to an embodiment of the invention, these steps are accomplished in time segments. In other words, after a certain predetermined time, if the analysis and classification are not terminated, step 210 for activation of backup application 34 is nevertheless started, with the possibility of returning later to steps 206 and 208 in order to continue the analysis and classification of the remaining data.

During step 210, backup application 34 is executed on at least a part of the digital data of computer installation 12, in accordance with the settings and the priority classes determined in steps 204 and 208.

During this step, backup application 34 transmits each digital element to be backed up, in accordance with the priority and/or selection rules established by programmed modules 36 and 38.

In an embodiment, it also runs a load regulation test according to the load of backup system 16, before transmitting each data element or group of data. In this case, backup server 40 regularly transmits to installation 12 information concerning its current load, for example enabling five load levels to be defined: "quiet", "normal", "loaded", "maximum", "refusal", each associated with a predetermined S1 score. The element to be backed up is then itself associated with an S2 score calculated according to priority coefficient C1 of the class in which it was placed during step 208, but weighted by other coefficients imposed by the administrator of the backup system, such as for example:

- a user coefficient C2 taking a high value when this is a first backup for installation 12 and otherwise a low value,
- a coefficient for the importance of the element, C3, which can be calculated using a method similar to that used by programmed module 36, but by the administrator,
- a coefficient C4 for updating the element, taking a high value when this is a first backup for this element, and otherwise a low value.

In practice S2 may be obtained by the formula S2=C1. (C2+C3+C4), and then compared to S1. If S2 is higher than or equal to S1 the element is transmitted to the backup server; otherwise it is not transmitted and is put aside for another backup.

In an embodiment, backup application 34 runs another test on the element to be backed up, before actually transmitting it to backup server 40. It makes a traditional signature computation on this element, and transmits this signature to backup server 40. The latter compares this signature to those of the data which is already stored in its secure storage spaces 42, 44, 46, including for other installations than installation 12. If an element already present in storage system 16 has the same signature as the element to be backed up for installation 12, only a single reference to this data element will be stored by backup server 44 installation 12, and there is no requirement for the element to be transmitted. Otherwise, the element to be backed up is transmitted. This embodiment enables the load of backup system 16 to be alleviated, preventing redundancies of files in the secure storage spaces 42, 44 and 46.

When step 210 is terminated, test step 212 is started, to check whether all the data likely to be backed up has been processed, or whether data still remains to be analysed (when steps 206 and 208 are accomplished in segments, or when the backup has been accomplished in a degraded mode, or following a first backup, or when data has caused fatal errors, etc.). If more data must be analysed it returns to step 206; otherwise step 214 is started.

When the backup is accomplished in segments it is possible to postpone the backup of certain data, notably that which is present and has not been modified for some time in computer installation 12. It is thus possible to define a decreasing priority of data elements according to their ages, with the successive backups dating back over time.

Step 214 consists in waiting for an event, for example a clock signal for a re-initialisation of analysis and backup application 32 (event A), or the detection of the creation in memory or of modification of an element likely to be backed up (event B).

When an event is detected test step 216 is started in order to identify this event. Event A causes a return to step 200, whereas event B causes an analysis of the created or modified digital element, assigning it a priority coefficient, followed by a return to step 210, in order to execute backup application 34 in relation to this digital element, according to the settings and priority coefficient assigned to it.

In an embodiment of the invention, when computer installation 12 undertakes its first backup to backup system 16, the initial step 200 is immediately followed by the step of execution of the backup application, 210, without execution of programmed modules 30, 36 and 38, as indicated by the dotted arrow in FIG. 4. The backup is started in the form of a fast backup, in order that only a certain limited quantity of digital data, a priori considered vital, such as the data relative to an address book of an email application, favourites and, for example, the last ten documents read, is transmitted.

It clearly appears that a data backup system such as the one presented in reference to FIGS. 1 to 4 enables the backup of data to be facilitated from the user's standpoint, since it requires a minimum of interventions on their part.

It will also be noted that the invention is not confined to the previously described embodiments.

Notably, the computer installation is not confined to the two structures illustrated in FIG. 1. As a variant, the computer installation may consist of multiple computers and/or other devices likely to store data, connected to one another in a local network.

Also as a variant, rules other than those presented can refine the steps of configuration of the backup application, and of analysis of the data with a view to its classification.

The invention claimed is:

1. A method for automatic backup of digital data, kept in a memory in a computer installation, to a remote backup system accessible by the computer installation via a data transmission network, the method comprising:
   extracting and analyzing operating information of the computer installation, said operating information including a date of manufacture or commissioning of the computer installation, a frequency with which the computer installation is started up, put on standby or shut down, and at least one of available power and memory, a nature and version of an operating system of the computer installation, a nature of applications installed and able to be executed by the computer installation, a nature and capacity of a connection of the computer installation to the data transmission network, and a general organization of directories and classification of files in the directories;
   determining settings of a backup application for backing up data to the backup system according to the result of the extracting and analyzing of the operation information,
   analyzing the digital data kept in the memory and classifying the analyzed digital data into a plurality of classes of differing priorities; and
   executing the backup application on at least a part of the digital data, according to the determined settings and classes of priorities.

2. The method for automatic backup of digital data according to claim 1, wherein the settings of the backup application comprise at least one of a consumed power limit authorized for the backup application, an option to execute the backup application in a degraded mode, and a criteria for selecting the digital data to be backed up.

3. The method for automatic backup of digital data according to claim 1 or 2, wherein a criteria for selection and/or classification of the digital data into the classes of differing priorities relate at least to a nature of the digital data.

4. The method for automatic backup of digital data according to claim 3, wherein the criteria for selection and/or the classification of the digital data into the classes of differing priorities also relate to at least one of a size of the digital data, dates of creation of the digital data, latest modification and/or latest access of the digital data, additional data associated with the digital data, a directory in which the digital data is located, a relationship between the digital data and a registry database of the operating system of the computer installation and whether or not the digital data is included in a list of data which is a priori excluded, or a priori included.

5. The method for automatic backup of digital data according to claim 1, comprising:
- defining at least a part of the settings of the backup application from an administration server connected to the data transmission network; and
- transmitting said part of the settings to the computer installation for execution of the backup application on the basis of at least said part of the settings.

6. The method for automatic backup of digital data according to claim 1, further comprising:
- detecting a creation in the memory or a modification of a digital element;
- in response to the detection, analyzing the digital element in order to assign a priority coefficient to the digital element; and
- executing the backup application on the digital element, according to the settings and the priority coefficient which is assigned to the digital element.

7. A non-transitory computer-readable data storage medium including computer-readable instructions that when executed by a computer cause the computer to execute a method according to claim 1.

8. A computer installation for the automatic backup of digital data to a remote backup system accessible by the computer installation via a data transmission network, comprising means for storage of digital data and a backup application for backing up at least part of the digital data to the remote backup system, the computer installation comprising:
- means for extracting operating information of the computer installation, said operating information including a date of manufacture or commissioning of the computer installation, a frequency with which the computer installation is started up, put on standby or shut down, and at least one of available power and memory, a nature and version of an operating system of the computer installation, a nature of applications installed and able to be executed by the computer installation, a nature and capacity of a connection of the computer installation to the data transmission network, and a general organization of directories and classification of files in the directories;
- means for analyzing the operation information and means for determining settings of the backup application according to a result of the analysis;
- means for analyzing the digital data stored by the computer installation and means for classifying the analyzed digital data into a plurality of classes of differing priorities,
- wherein the backup application is configured to be executed on at least a part of the digital data, according to the determined settings and classes of priorities.

9. A computer system for the automatic backup of digital data kept in memory in a computer installation, comprising a computer installation according to claim 8 and a remote backup system accessible by the computer installation via a data transmission network.

* * * * *